United States Patent
Tominaga

[11] Patent Number: 5,121,372
[45] Date of Patent: Jun. 9, 1992

[54] OPTICAL INFORMATION PROCESSING APPARATUS FOR PERFORMING TRACK JUMP WHILE AVOIDING PREFORMAT SIGNAL

[75] Inventor: Hidekazu Tominaga, Kawasaki, Japan

[73] Assignee: Canon Kabushiki Kaisha, Tokyo, Japan

[21] Appl. No.: 727,366

[22] Filed: Jul. 9, 1991

Related U.S. Application Data

[63] Continuation of Ser. No. 313,487, Feb. 22, 1989, abandoned.

Foreign Application Priority Data

Feb. 24, 1988 [JP] Japan .................. 63-039675

[51] Int. Cl.⁵ .................................... G11B 7/00
[52] U.S. Cl. ................. 369/44.26; 369/44.28; 369/44.32
[58] Field of Search ............... 358/907; 369/44.11, 369/44.26, 44.28, 44.29, 44.32, 44.33

[56] References Cited

U.S. PATENT DOCUMENTS

| | | | |
|---|---|---|---|
| 4,057,832 | 11/1987 | Kappert | 358/128 |
| 4,727,528 | 2/1988 | Wyland | 369/33 |
| 4,779,251 | 10/1988 | Burroughs | 369/32 |

FOREIGN PATENT DOCUMENTS

| | | |
|---|---|---|
| 0139315 | 5/1985 | European Pat. Off. . |
| 2497991 | 7/1982 | France . |
| 58-150137 | 9/1983 | Japan . |
| 2093227 | 8/1982 | United Kingdom . |

*Primary Examiner*—Robert L. Richardson
*Attorney, Agent, or Firm*—Fitzpatrick, Cella, Harper & Scinto

[57] ABSTRACT

In an apparatus using an optical recording medium having a plurality of parallel tracks and a region which indicates tracking control provided in part of the longitudinal direction of each track, information is recorded and/or reproduced by scanning the tracks with a light beam, and a track jumping device transfers the light beam from the presently scanned track to another track when the light beam is not scanning such region.

18 Claims, 5 Drawing Sheets

FIG.4A 13-a RF1
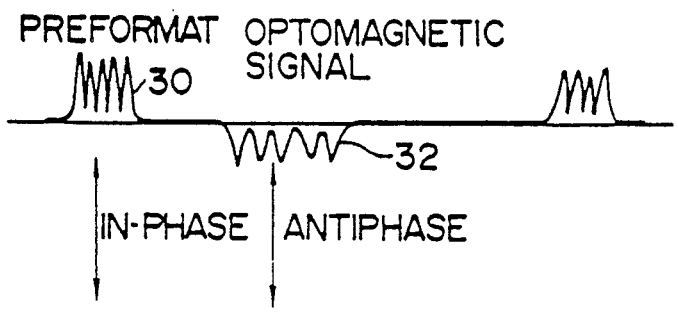
FIG.4B 13-b RF2
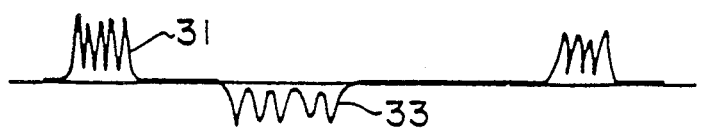
FIG.5
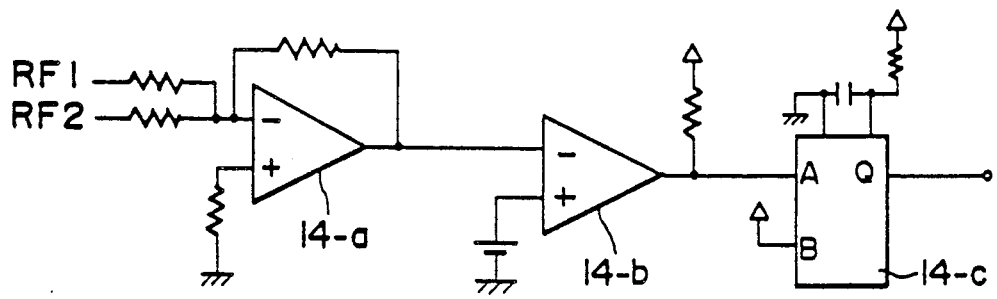
FIG.6A 15-a
FIG.6B 15-b
FIG.6C 15-c

OPTICAL INFORMATION PROCESSING APPARATUS FOR PERFORMING TRACK JUMP WHILE AVOIDING PREFORMAT SIGNAL

This application is a continuation of prior application Ser. No. 07/313,487 filed Feb. 22, 1989, now abandoned.

BACKGROUND OF THE INVENTION

1. Field of the Invention

The present invention relates to an optical information processing apparatus in which a focused light beam is irradiated onto an optical recording medium and information is recorded and/or reproduced.

2. Related Background Art

Hitherto, apparatuses for recording or reproducing a signal by using a laser beam have been put into practical use. For example, a compact disc (CD) player, a laser disc (LD) player, and the like have been known. In these apparatuses, a signal is recorded as pits 2 on a disk 1 as shown in FIG. 1. To read the information signal from the disk 1, the light beam is projected onto the disk 1 and optically scans to thereby read the pits 2. That is, when tracks on which the pits 2 are formed are scanned by the light beam, an intensity of the reflected light changes in correspondence to the presence or absence of the pit, so that the information pits can be optically read.

On the other hand, there has also been developed a magneto-optical disk apparatus in which a light beam is projected onto a magneto-optical disk on which tracks are spirally or concentrically formed and the information signal is optically recorded, reproduced, or erased. FIG. 2 shows a construction of a magneto-optical disk 3 which is used in such an apparatus.

In the diagram, reference numeral 4 denotes, for instance, a track guide groove formed spirally on the disk. The magneto-optical signal is recorded in the central region between the track guide groove and the adjacent track guide groove. Reference numeral 5 denotes preformat bits indicative of a detection pattern such as track addresses, sector addresses, sector marks, and the like in the case of using the magneto-optical disk as a disk for data information or the like. The preformat pits 5 are formed in the central region between the track guide groove and the adjacent track guide groove. An address is read by the preformat pit 5 and the data corresponding to the address is reproduced, recorded, or erased by a magneto-optical signal in the circumferential direction for a period of time until the next preformat pit 5.

In the case where the tracks are spirally formed on the disk, the tracks are constructed as a single long track. However, in the invention, it is assumed that the track of one circumference of a disk if formed and a number of such tracks are arranged in parallel in the radial direction.

In a tracking servo system for allowing a light beam to trace the tracks by using the track guide grooves 4 on the disk 3 as mentioned above, a reflectance of the disk surface deteriorates at the location of the preformat pit and, further, an S/N ratio of a tracking error signal deteriorates, and a kind of noise is generated. If an amount of the preformat pits occupies about 4 to 5% of the area on all of the track guide grooves and when the tracking servo system is in the operative mode, a degree of tracing fidelity of the tracks slightly deteriorates and a situation such that the tracking servo becomes ineffective does not occur.

However, for instance, in the case of jumping to the adjacent track and reproducing data from the adjacent track as disclosed in U.S. Pat. No. 4,057,832, there is executed a sequence such that the tracking servo is made inoperative, the light beam jumps to the next adjacent track, and when the light beam arrives at a predetermined position on the next adjacent track, the tracking servo system is again made operative. In such a case, it is necessary to raise the gain immediately after the tracking servo is made operative, thereby enabling the tracking servo to be easily pulled in. However, in the case of making the tracking servo operative at the position of the preformat pit, the noise of the preformat pit is also amplified, so that there is a problem such that the pull-in of the tracking servo becomes unstable.

SUMMARY OF THE INVENTION

It is an object of the present invention to solve the problems of the conventional techniques as mentioned above and to provide an optical information processing apparatus which can perform the track jumping operation in a stable manner.

The above object of the invention is accomplished by an apparatus in which an optical recording medium having a plurality of parallel tracks and a region which exerts an influence on a tracking control is provided in a part of each track in the longitudinal direction is used and information is recorded and/or reproduced by scanning the tracks with a light beam, wherein when the light beam is transferred from the track which is being scanned to another track by traversing the tracks, the region is avoided while the light beam is transferred.

BRIEF DESCRIPTION OF THE DRAWINGS

FIG. 1 is a diagram showing an external view of a conventional disk such as CD, LD, or the like;

FIGS. 4A and 4B are diagrams showing an output waveform of an RF signal;

FIG. 5 is a diagram showing a preformat detecting circuit;

FIGS. 8A-8D are timing charts for explaining the operation of the embodiment of the invention.

DETAILED DESCRIPTION OF THE PREFERRED EMBODIMENT

Figure 3:
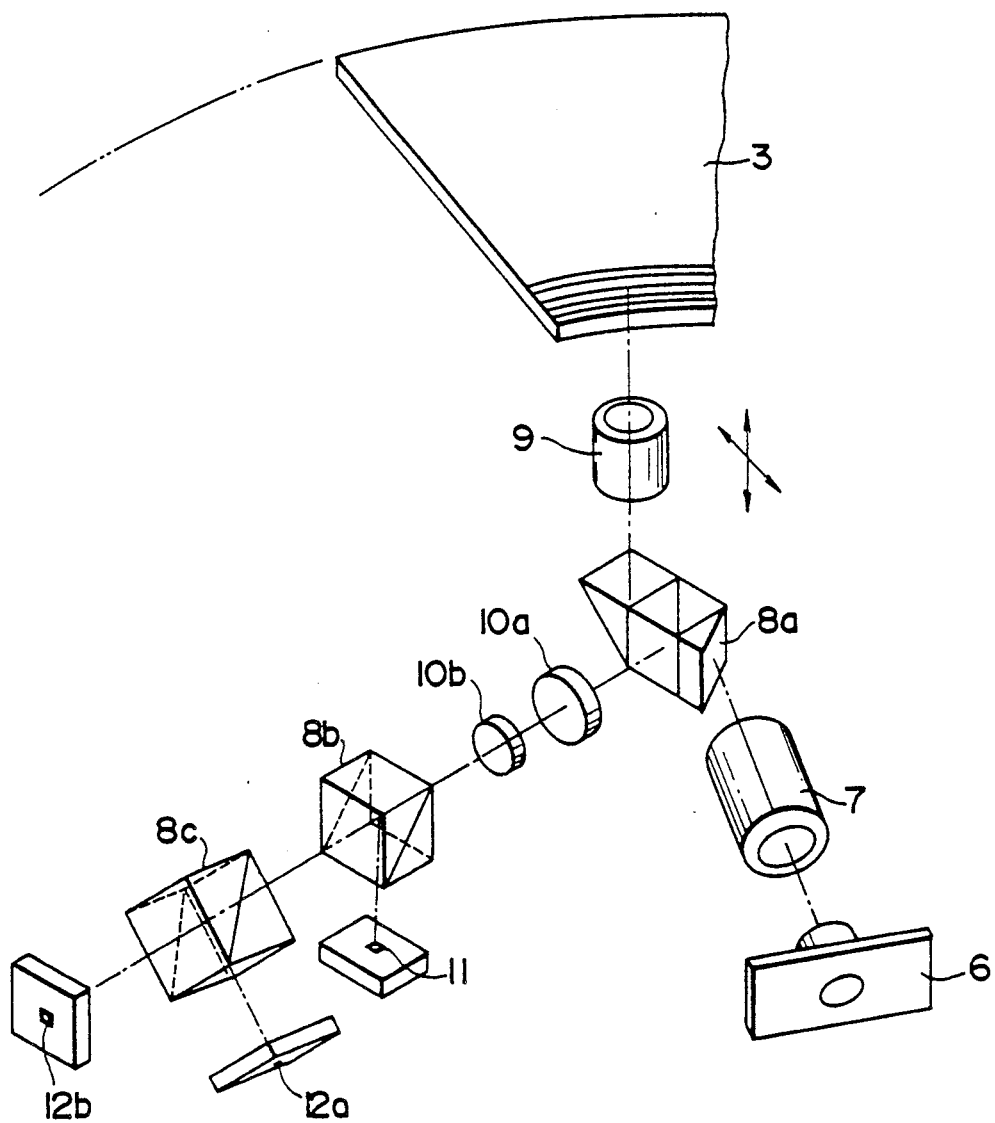
FIG. 3 is a constructional diagram of an optical system in an embodiment of the present invention.

FIG. 3 is a schematic perspective view showing a construction of an optical system in an embodiment in the case where the present invention is applied to a magneto-optical disk apparatus.

In FIG. 3, a light beam to read and write information of a magneto-optical signal is emitted from a laser light source 6 comprising a laser diode and passes through a collimating lens 7 to convert the light beam into a parallel light beam. The parallel beam is transmitted in the direction of the disk by a polarization beam splitter (PBS) 8a and is focused onto the magneto-optical disk 3 by an objective lens 9. The reflected light from the disk 3 includes information from the disk and is returned to the objective lens 9 and PBS 8a and is transmitted to the side to be detected. The reflected light which was transmitted to the detector side by the PBS 8a passes through condenser lenses 10a and 10b to converge the light onto the detector. One of the reflected lights from the condenser lenses passes through a PBS 8b and is focused onto a servo detector 11 to collect a servo error signal. On the other hand, the other reflected light is transmitted through the PBS 8b and passes through a PBS 8c. The reflected lights reach an $RF_1$ detector 12a and an $RF_2$ detector 12b to collect an opto-magnetic signal and a prepit signal, respectively.

In the above construction, signal waveforms of the detectors 12a and 12b are shown in FIGS. 4A and 4B. In FIGS. 4A and 4B, reference numerals 30 and 31 denote preformat signals and 32 and 33 indicate opto-magnetic signals, respectively. As shown in FIGS. 4A and 4B, in the $RF_1$ and $RF_2$ signals, the opto-magnetic signals 32 and 33 appear in the antiphase relation and the preformat signals 30 and 31 appear in the in-phase relation. Therefore, the opto-magnetic signal is obtained as a differential signal of an $RF_1$ signal 13-a and an $RF_2$ signal 13-b. The preformat signal is obtained as an additional signal of the $RF_1$ signal 13-a and $RF_2$ signal 13-b.

Detecting means for detecting the preformat portion by using the RF signals will now be described with reference to FIGS. 5 and 6A–6C.

FIG. 5 is a diagram showing a preformat detecting circuit and FIGS. 6A–6C are diagrams showing a signal in each section in FIG. 5.

In FIG. 5, the $RF_1$ signal 13-a and $RF_2$ signal 13-b are first added by an adding amplifier 14-a. As mentioned above, since there is the antiphase relation between the opto-magnetic signals 32 and 33, the opto-magnetic signals are set off and only the preformat signal remains. The preformat signal is shown by 15-a in FIG. 6A.

The preformat signal is then binarized by a comparator 14-b on the basis of the level which is almost mid-level between the noise level and the peak level of the signal 15-a, so that a signal as shown by 15-b in FIG. 6B is obtained.

Finally, the binarized signal is waveform shaped by a one-shot multivibrator 14-c and a waveform as shown by 15-c in FIG. 6C is derived.

Figure 7:
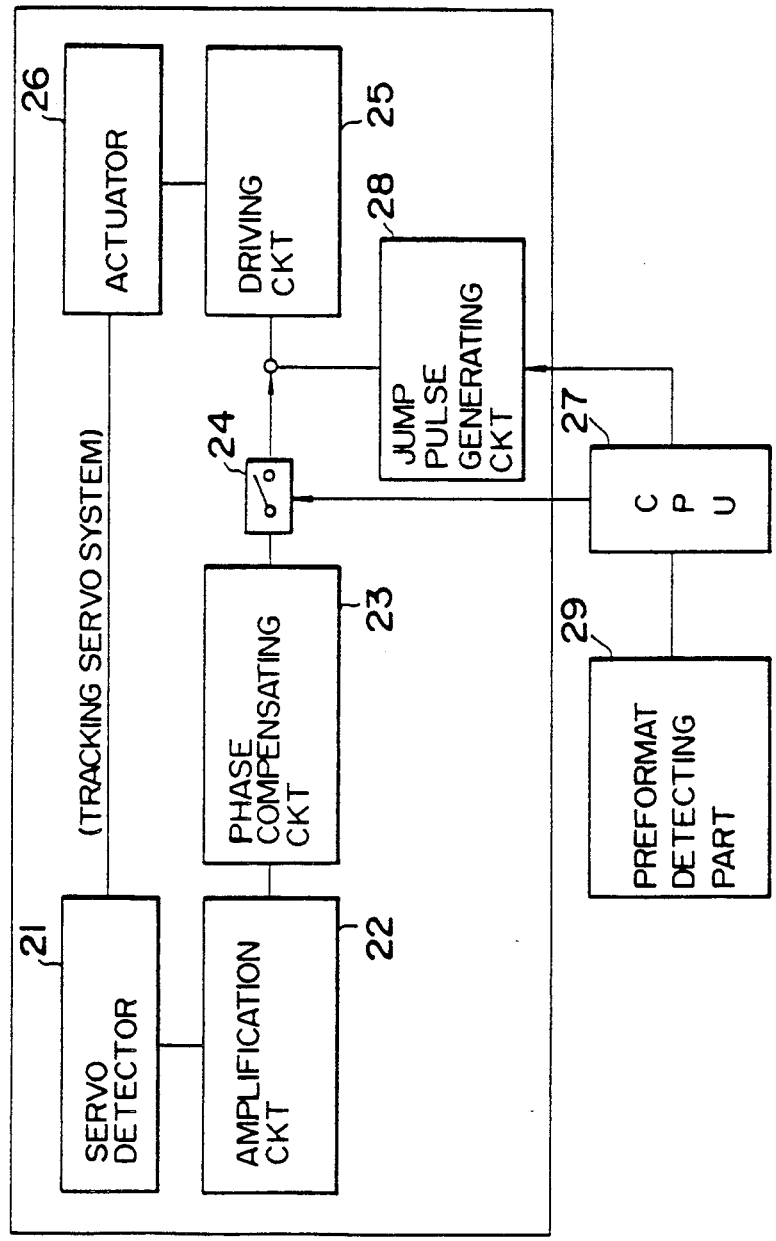
FIG. 7 is a block diagram of a tracking servo system in an embodiment of the invention.

FIG. 7 shows a block diagram of a tracking servo system of the magneto-optical disk apparatus in the embodiment. In the diagram, a servo detector 21 detects the reflected light from the disk 3 and detects a deviation amount of the light beam from the track guide groove as a tracking error signal. The tracking error signal is amplified to an objective gain by an amplification circuit 22 and is compensated by a phase compensating circuit 23 so as to obtain an objective phase margin. A loop switch 24 is used to make the tracking servo operative or inoperative. Upon track jump, the tracking servo is made inoperative. A driving circuit 25 drives an actuator 26 in such a direction as to reduce the deviation from the object by using the tracking error signal. When the loop switch 24 is switched to the operative side, the tracking servo functions. A central processing unit (CPU) 27 is a processor to control the tracking servo system. The CPU 27 receives an output signal from a preformat detecting part 29 and controls the on/off operation of the loop switch 24 and the on/off operation of a jump pulse generating circuit 28.

Figure 6:
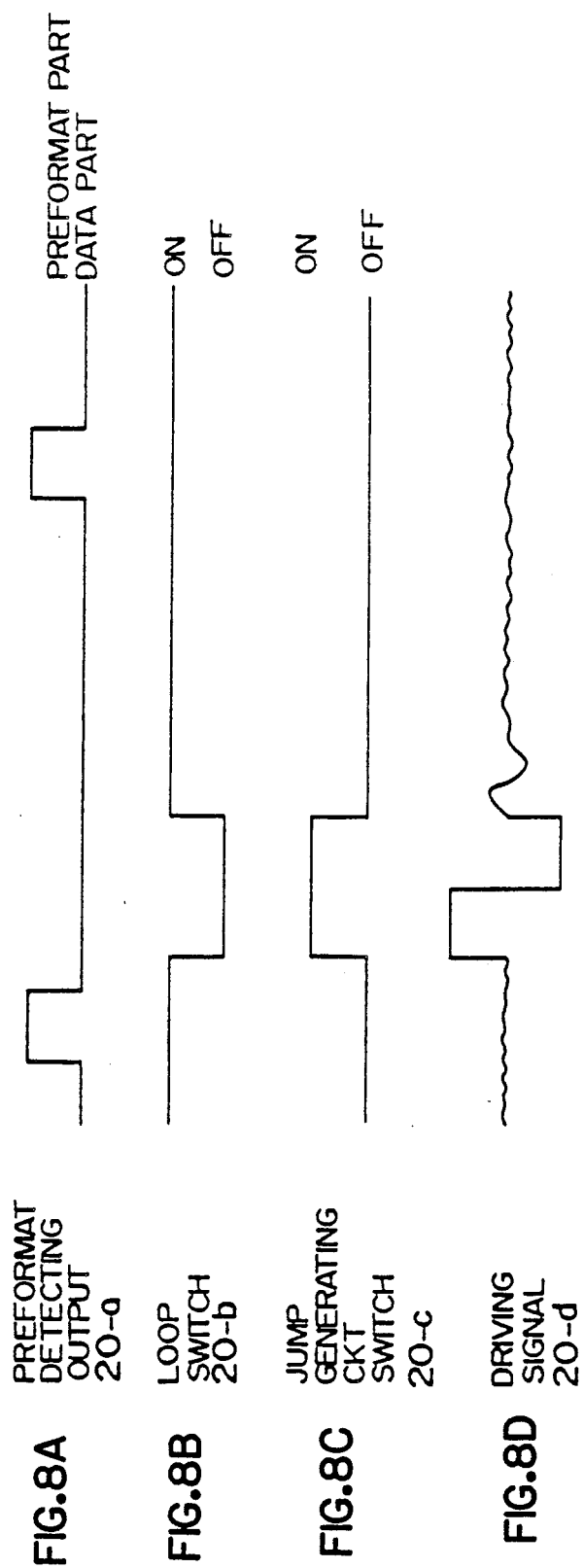
FIGS. 6A-6C are diagrams showing an output signal waveform in each section in FIG. 5.

FIGS. 8A–8D are timing charts for the operation of the apparatus. A method of jumping tracks while avoiding the preformat portion by using the preformat detecting output obtained as shown in FIG. 6 will now be described in accordance with the timing charts of FIGS. 8A–8D.

When accessing to an objective track, the tracks are jumped by the track jumping operation. In this case, the CPU 27 continuously monitors a signal of a preformat detecting output 20-a. As shown by 20-b, after confirming that the preformat portion has passed, the loop switch 24 for the tracking servo is turned off to thereby make the tracking servo inoperative. Subsequently, as shown by 20-c, the jump generating circuit 28 is made operative to perform the track jump. A driving signal becomes as shown by 20-d. A period of time from a preformat portion to the next preformat portion is generally about twice as long as the time which is required for the track jump. The tracking servo will have been settled until the next preformat portion comes. The servo system does not become unstable.

In the embodiment, after the preformat portion is passed, the timing to perform the track jump is set. However, the invention is not limited to such a construction. For instance, if the jumping operation requires a time longer than that of the preformat portion, even by executing the track jumping operation immediately after the start of detection of the preformat portion, the tracks can be stably jumped in a short time without overlapping.

Although the embodiment has been described with respect to the case where the preformat detecting part 29 was separately provided, in the actual apparatus, when an address is read, the preformat detecting part is certainly necessary. Therefore, since the preformat detecting part is included in the circuit of the RF signal processing system, the invention can be constructed by using an output signal from the RF signal processing circuit.

The present invention is not limited to the foregoing embodiment, but many variations and modifications are possible within the spirit and scope of the appended claims of the invention.

For instance, although the embodiment has been described with respect to the case where a portion in which a partial region on the recording medium is not preferable as compared with the other regions with respect to the tracking control being set to the preformat portion, such a portion is not necessarily limited to only the preformat portion.

Figure 1:
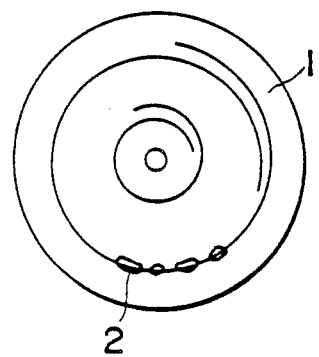
Figure 2:
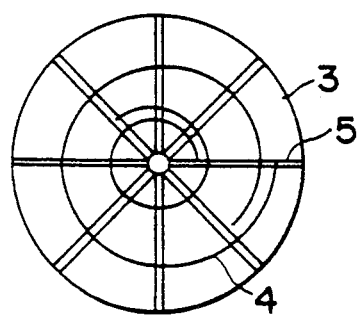
FIG. 2 is a diagram showing an external view of a magneto-optical disk.

On the other hand, by using an idea such that the timing when the preformat portion passed, the time which is required for the track jump, and its timing are adjusted, the invention also can be applied not only to the disk of a constant angular velocity (CAV) type shown in FIG. 2, but also to the recording disk of a constant linear velocity (CLV) type.

On the other hand, the invention also can be applied to apparatuses using any medium irrespective of the material of the magneto-optical medium, such as a direct-read-after-write (DRAW) type medium, or the like or a shape such as a card type, tape type, or the like.

What is claimed is:

1. An apparatus for recording and/or reproducing information from an optical recording medium, with the recording medium having a plurality of parallel tracks separated by a predetermined interval and each track including a noise region with a small S/N ratio of a tracking error signal, said apparatus comprising;

reading means for reading the information on a track of the optical recording medium, said reading means including a light source for emitting a light beam on a selected track to be read;

shifting means for moving said reading means to read information on another track on the optical recording medium; and control means for controlling said shifting means such that the light beam cannot be moved from the selected track to another track when the light beam scans the noise region in the selected track, and the light beam can be moved from the selected track to another track when the light beam scans a region other than the noise region.

2. An apparatus according to claim 1, wherein reflectivity of the noise region is lower than other portions on the track.

3. An apparatus according to claim 1, wherein the noise region includes a recorded preformat signal.

4. An apparatus for recording and/or reproducing information from an optical recording medium having a plurality of parallel tracks, with each track having a noise region where an SN ratio of a tracking error signal is small, said apparatus comprising:

means for reading the information on each track, including a light source for illuminating a selected track to be read;

tracking control means for following the light beam along the selected track;

track jumping means for moving the light beam from the selected track to another track;

detection means for detecting the noise region; and means for controlling said track jumping means so as not to transfer the light beam when said detection means detects the noise region, and to transfer the light beam from the selected track to another track when said detection means does not detect the noise region.

5. An apparatus according to claim 4, wherein said tracking control means comprises tracking error signal detecting means and driving means for shifting the light beam in such a direction to transverse the tracks in accordance with an output of said tracking error signal detecting means.

6. An apparatus according to claim 5, wherein said track jumping means comprises means for supplying a jump pulse to said driving means.

7. An apparatus according to claim 4, wherein said detecting means comprises a photodetector for receiving a light beam reflected from the tracks and a circuit for generating a detection signal of the noise region from the output signal of said photodetector.

8. An apparatus according to claim 4, wherein reflectivity of the noise region is lower than other portions on the track.

9. An apparatus according to claim 4, wherein the noise region includes a recorded preformat signal.

10. An apparatus for recording and/or reproducing information from an optical recording medium having a plurality of parallel tracks, with a preformat signal being recorded in each track, said apparatus comprising:

a light source for emitting a scanning light beam;

a lens for converging the light beam emitted from said light source onto the medium;

an actuator for allowing the light beam to trace a track to be scanned;

a jump pulse generating circuit for supplying a jump pulse to said actuator for transferring the light beam from the scanned track to another track;

a circuit for detecting the preformat signal; and a circuit for controlling said jump pulse generating circuit to prevent said jump pulse generating circuit from outputting a jump pulse when said detection circuit detects the preformat signal, and allowing said jump pulse generating circuit to output the jump pulse when said detection circuit does not detect the preformat signal.

11. An apparatus according to claim 10, wherein said control circuit allows the jump pulse to be input from said jump pulse generating circuit to said actuator immediately after said light beam passed the portion of the track in which the preformat signal is recorded.

12. An apparatus according to claim 10, wherein said detecting circuit comprises a detector to detect the reflected light of the light beam by said medium.

13. An apparatus according to claim 10, further comprising a tracking error signal detecting circuit.

14. An apparatus according to claim 13, further comprising a switching circuit for stopping the tracking error signal from the tracking error detection circuit from being supplied to said actuator when the jump pulse is supplied from said jump pulse generating circuit to said actuator.

15. A method for moving a light beam from a track which is being scanned to another track on an optical recording medium, with each of a plurality of parallel tracks including a noise region having a small SN ratio of a tracking signal, said method comprising the steps of:

scanning the noise region of a selected track with the light beam;

detecting when the light beam scans the noise region of the selected track; and moving the light beam to another track when the light beam scans a region other than the noise region in the selected track.

16. A method according to claim 15, wherein reflectivity of the noise region is smaller than other portions in the tracks.

17. A method according to claim 15, wherein the noise region includes a recorded preformat signal.

18. A method for recording and/or reproducing information from an optical recording medium having a plurality of parallel tracks, with each track including a region where a preformat signal is recorded in the longitudinal direction, said method comprising the steps of:

scanning a selected track for information;

detecting a tracking error signal in the selected track and outputting a tracking error detection signal;

detecting the preformat signal in the selected track and outputting a preformat detection signal;

stopping output of the tracking error detection signal when the preformat detection signal is not detected;

moving the light beam to another track when the tracking error signal is not output; and scanning another track with the light beam by restarting the tracking error signal after moving the light beam to the another track.

* * * * *

UNITED STATES PATENT AND TRADEMARK OFFICE
CERTIFICATE OF CORRECTION

PATENT NO. : 5,121,372
DATED : June 9, 1992
INVENTOR(S) : Hidekazu Tominaga

It is certified that error appears in the above-identified patent and that said Letters Patent is hereby corrected as shown below:

COLUMN 3

Line 41, "15-*b in FIG. 6B*" should read --15-b in FIG. 6B--; and
Line 42, "*is obtained*" should read --is obtained--.

COLUMN 5

Line 24, "SN ratio" should read --S/N ratio--.

COLUMN 6

Line 33, "SN ratio" should read --S/N ratio--.

Signed and Sealed this

Twenty-fourth Day of August, 1993

Attest:

BRUCE LEHMAN

*Attesting Officer*    *Commissioner of Patents and Trademarks*